Patented Nov. 23, 1926.

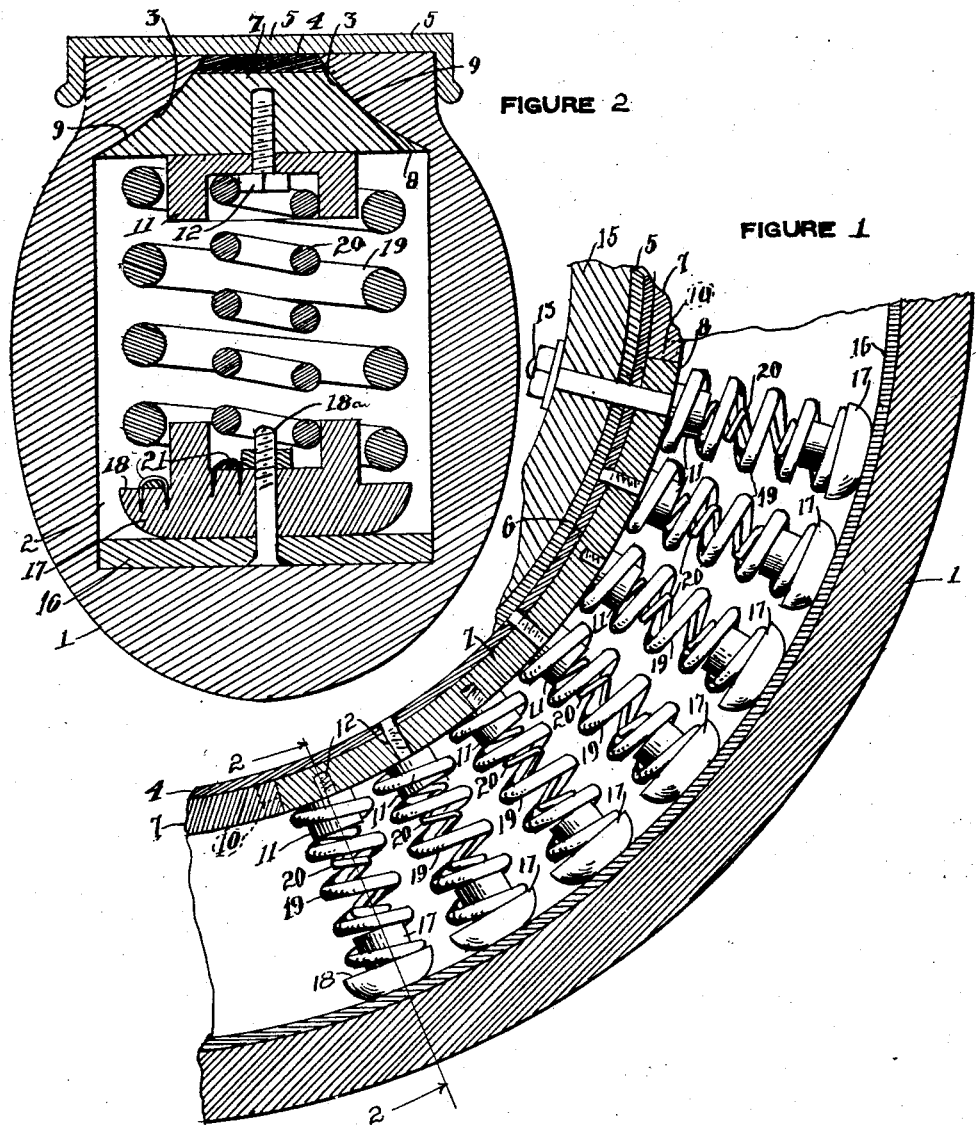

1,607,859

UNITED STATES PATENT OFFICE.

JOHN AGRILLO AND JOSEPH DALY, OF SAN JOSE, CALIFORNIA.

VEHICLE WHEEL TIRE.

Application filed September 3, 1925. Serial No. 54,259.

One object of our invention is to provide a highly efficient mechanical substitute for air in hollow resilient tires.

Another object of the invention is to provide a structure of the character indicated that will be simple in form and construction, readily constructed for all sizes and kinds of hollow tires, quickly and easily inserted in a tire, and highly efficient in its practical application.

It is also an object of the invention to provide a highly efficient form of tire for use in conjunction with the mechanical structure above referred to.

In the drawing:—

Figure 1 is a detail section through a portion of a tire at right angles to its axis of rotation.

Figure 2 is a section on line 2—2 of Figure 1 but greatly enlarged.

Referring more particularly to the drawing, we show at 1 a vulcanized rubber tire, the interior of which is rectangular in transverse cross-section as at 2, with rounded shoulders at 3—3.

At 4 is shown a steel ring having an internal circumference substantially equal to the external circumference of the wheel rim 5, a joint being shown therein at 6. This ring is in one piece and fits between the inner edges of the tire shoulders 3—3 as clearly shown in Figure 2.

At 7 we show a segment of a wood ring having a cylindrical outer surface 8 and inwardly curved sides 9—9 adapted to seat against the curved shoulders 3—3 of the tire 1. These segments are duplicated in sufficient numbers to make a complete ring with joints as at 10—10 and within which the steel ring 4 fits closely as shown.

On each segment 7 are spaced and radially arranged cups 11 held in place by screws 12, certain of which pass clear through the wood segment and the ring 4 to effectively prevent lateral displacement of one relative to the other. At one point in the complete wheel a bolt as 13 is extended clear through the demountable rim 5 and the felly 15 to bind the whole against creeping on the felly.

A leather belt of suitable thickness is shown at 16 encircling the interior of the tire and carrying spaced cups 17, each cup having an outer base flange 18 and being secured to the belt 16 by a bolt as 18ª in axial alignment with one of the cups 11.

A main spring 19 is fitted over each cup 11 and inserted between the segment 7 and the flange 18 on the opposing cup 17, and another smaller spring 20 is inserted between and within each pair of opposing cups 11 and 17.

In assembling the structure the cups 17 are first properly spaced along and secured to the inner surface of the belt 16 and the latter is then placed in position in the tire. Upon each segment 7 are mounted the spaced cups 11. The springs 19 and 20 being placed in position on cups 17 and held in any suitable manner as by staples 21, the segments 7 are placed in the tire with cups 11 engaging springs 19 and 20 as shown the several segments locking as described.

The ring 4 is now arranged in the wood ring in engagement with the smooth ends of the longer screws 12. The rim 5 now being placed in position the whole structure is mounted on the wheel felly in the usual manner.

A wheel constructed in the manner set forth eliminates the necessity of providing an inner tube for the tire, and obviously no material damage is done by an ordinary puncture in the tire. By properly designing the structure to conform to the weight to be carried results closely approximating those obtained by the use of pneumatic tires are obtained in so far as resiliency is concerned.

The form of the segments 7 is considered an important matter in this invention since the curved sides 9—9 bear against the curved shoulders 3—3 of the tire and cooperate with the flanges on the rim 5 to securely lock the parts together. In operation each spring unit operates independently of the others and the several units are brought successively into use as the wheel revolves.

It is to be understood, of course, that while we have herein shown and described but one specific embodiment of our invention, changes in form, construction, and method of operation may be made within the scope of the appended claims.

We claim:—

1. In combination with a hollow resilient tire and a supporting ring engaging the outer edges of its inner periphery, a metallic ring mounted upon said first mentioned ring between the inner edges of the tire, a segmental wood ring mounted upon said metallic ring and engaging the adjacent edges of the said tire, spaced radially arranged bolts passing through said metallic ring and wood ring, outwardly directed cup elements mounted on said wood ring and secured thereto by said bolts, a pair of concentrically arranged springs associated with each cup, one spring being seated within the cup and the other spring being seated therearound on said wood ring, a cup element provided with a base flange mounted upon the outer ends of each pair of springs, an annular leather belt encircling the interior of the tire, and means for mounting said last mentioned cups on said belt.

2. In combination with a hollow resilient tire a supporting element insertible in the inner portion of the tire, and carrying a plurality of radially arranged cup elements, a spring mounted within each cup element, a second spring mounted around the outer side of each cup element in concentric relation to said first spring, a flexible supporting element insertible in the outer portion of the tire to bear against its outer wall and having a plurality of spaced cup elements mounted thereon in opposed relation to the first mentioned cup elements, the last mentioned cup elements having flanges to engage the outer spring and forming a seat for the inner spring.

JOSEPH DALY.
JOHN AGRILLO.